United States Patent [19]
Mueller

[11] 3,752,275
[45] Aug. 14, 1973

[54] TRANSMISSION WITH BRAKE OPERATED DOWN SHIFTER

[76] Inventor: Otto Mueller, 13 Byfield Ln., Dearborn, Mich. 48120

[22] Filed: Feb. 9, 1972

[21] Appl. No.: 224,680

[52] U.S. Cl............................................. 192/4 A
[51] Int. Cl............................................ B60k 29/02
[58] Field of Search................................... 192/4 A

[56] References Cited
UNITED STATES PATENTS

| | | | |
|---|---|---|---|
| 3,523,597 | 8/1970 | Lemieux | 192/4 A |
| 2,337,417 | 12/1943 | Russell | 192/4 A X |
| 2,872,000 | 2/1959 | Herndon et al. | 192/4 A |
| 3,001,415 | 9/1961 | Smirl | 192/4 A X |
| 3,426,624 | 2/1969 | Karig et al. | 192/4 A X |
| 3,631,950 | 1/1972 | Tanaka | 192/4 A |

*Primary Examiner*—Benjamin W. Wyche
*Attorney*—Olsen & Stephenson

[57] ABSTRACT

Apparatus for a motor vehicle that shifts the automatic transmission from a normal drive setting of the selector lever to a low speed setting to utilize the engine braking effort when the vehicle brakes are applied and shifts the automatic transmission back to its drive setting when the brakes are released.

15 Claims, 13 Drawing Figures

Patented Aug. 14, 1973

Patented Aug. 14, 1973
3,752,275
4 Sheets-Sheet 3
FIG.8
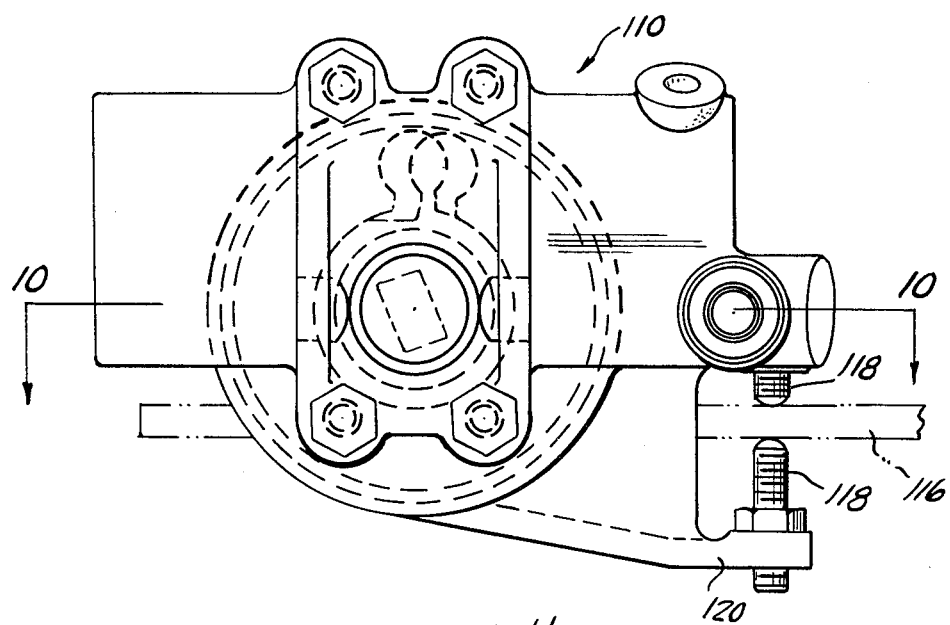
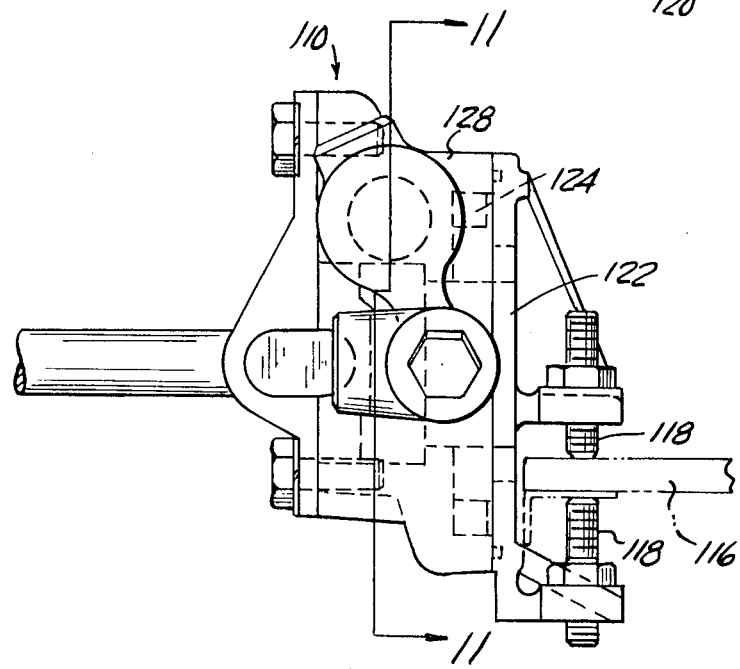
FIG.9

Patented Aug. 14, 1973

TRANSMISSION WITH BRAKE OPERATED DOWN SHIFTER

BACKGROUND OF THE INVENTION

The present invention relates to apparatus for improving the braking characteristics of a motor vehicle that has an automatic transmission, and relates especially to a shift control mechanism that is responsive to the application of the vehicle brakes to shift the automatic transmission to a lower output gear ratio so that the engine drag can be utilized to aid in reducing the vehicle speed.

In automobiles that have conventional automatic transmissions, three forward speed settings are generally provided, one that is designated as "D" represents the normal drive setting for the controls, and two progressively lower gear settings are provided which generally are designated as "L2" and "L1." When the vehicle is being operated at the normal drive setting of the transmission and the brakes are applied, the engine contributes very little effort towards slowing down the speed of the vehicle, but instead, operates to some extent in a free-wheeling state. Thus, the operation of slowing down the vehicle must be performed almost entirely by the braking action of the vehicle brakes.

From the standpoint of safety, serious problems can arise when brakes are applied, particularly when the vehicle is travelling at high speeds, if the brakes of the wheels are not uniformly applied. The braking effort or drag of the engine, which is often used, for example, when descending long hills, results in even distribution of the holding action to the driving wheels, but such engine drag is not available for quick stopping action when driving a vehicle that has an automatic transmission. Thus, there is a need for improving the braking characteristics of motor vehicles that have automatic transmissions so that improved and safer braking action is obtained.

BRIEF SUMMARY OF THE INVENTION

The present invention provides an attachment for a motor vehicle that has a conventional automatic transmission, whereby application of the wheel brakes of the vehicle automatically shifts the transmission to a low gear setting so that the braking effort or drag of the engine can be utilized to aid in slowing down the vehicle. The improvement can be used in conjunction with any vehicle having an automatic transmission, but it is especially well-suited for use with vehicles that torque bias control differential transmissions of the type disclosed, for example, in applicant's issued U.S. Pat. Nos. 3,393,582, and 3,393,583. Torque bias control differential transmissions of the type shown in these patents assure that only limited or controlled differential action will occur between driving wheels, and differentials of this character can function equally well when rapid deceleration of an engine occurs to assure that the holding action of the wheels resulting from the engine drag or braking effort will remain uniform on the driving wheels so that the vehicle maintains stability during slow down.

According to a preferred form of the present invention, a motor vehicle is provided that has a multiple speed automatic transmission, transmission control means for selectively setting the output speed of the transmission, wheel brake means, and a shift control mechanism responsive to the application of the wheel brake means at one transmission speed setting to shift the transmission control means to a second transmission speed setting and responsive to the release of the brake means to shift said transmission control means back to said one transmission speed setting.

Preferably, the shift control mechanism is in the form of an attachment which comprises a bracket portion adapted to be mounted in a stationary position and a rotary portion adapted to be coupled to the rotatable shift lever of the automatic transmission. The rotory portion has one member adapted to be secured to the rotatable shift lever for rotation therewith and a second member normally retained in a first position relative to said one member and movable in response to an applied force, such as results when the brake is applied, to a second position relative to said one member. Spring means are provided that bias said one member to the one position, and an actuator piston is movable in response to hydraulic brake fluid under pressure, or the like, for moving said second member against the biasing action of said spring means to said second position. Hydraulic passage means are provided for introducing hydraulic fluid, such as from the brake system, to said actuator piston when the hydraulic brakes of the vehicle are applied.

The shift control mechanism is constructed and arranged so that the hydraulic fluid from the brake system can flow to the actuator piston to shift the shift lever of the transmission only when the vehicle is in its drive position.

Thus, it is an object of the present invention to provide an improved shift control mechanism for use in a motor vehicle which will improve the braking characteristics of the vehicle.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG.8 is a side elevational view of a shift control mechanism embodying another form of the present invention;

FIG. 9 is an end elevational view of the embodiment of the invention shown in FIG. 8;

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
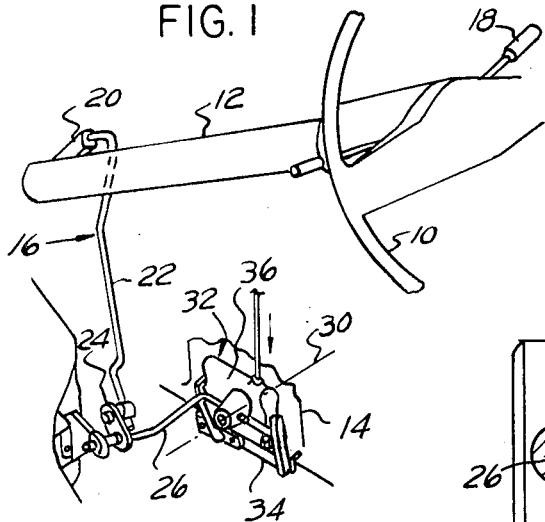
FIG. 1 is a fragmentary perspective view of a motor vehicle showing a shift control mechanism embodying one form of the present invention.
Figure 5:
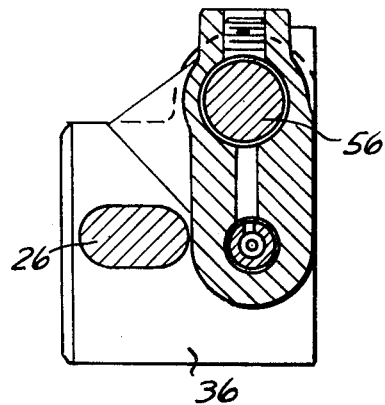
FIG. 5 is a section taken on the lines 5—5 of FIG. 2.
Figure 2:
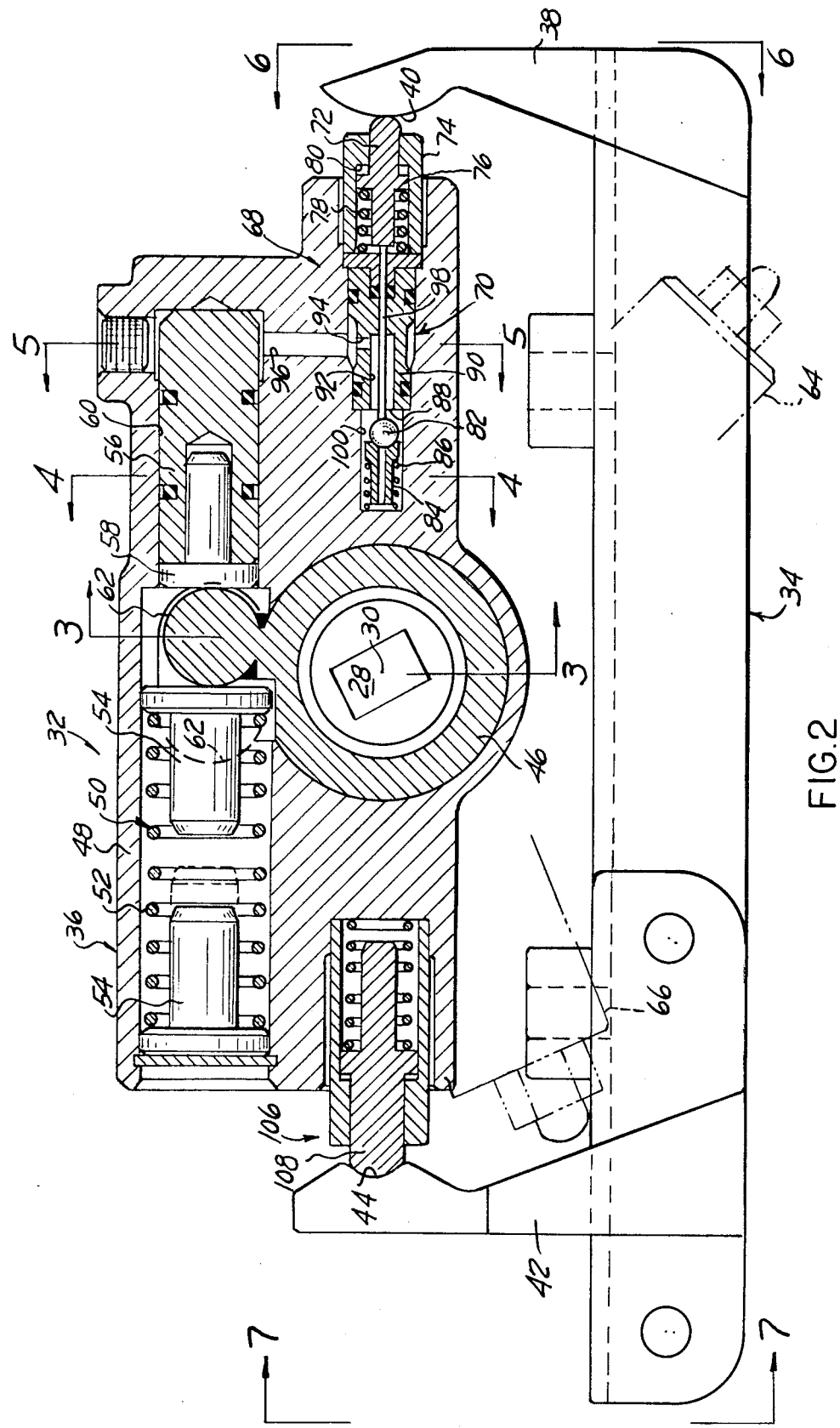
FIG. 2 is an enlarged cross section of the embodiment of the invention illustrated in FIG. 1.
Figure 10:
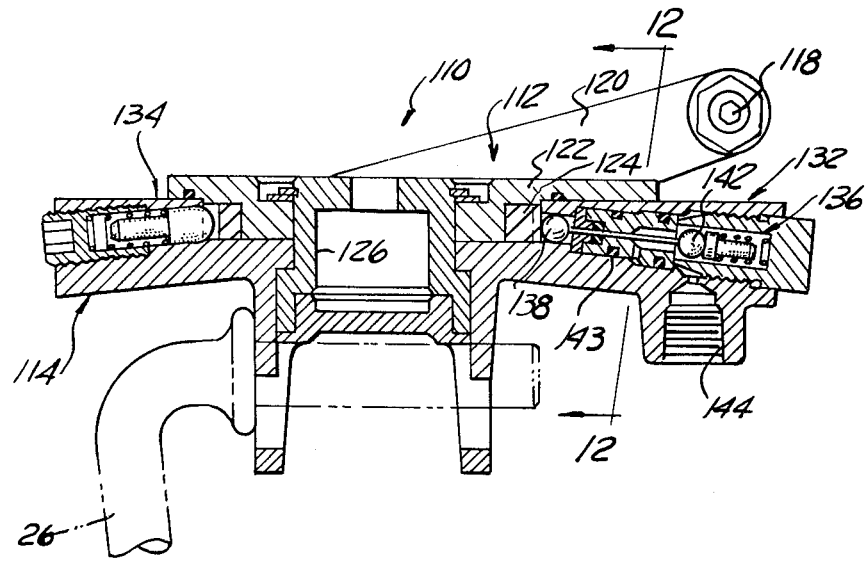
FIG. 10 is a sectional view taken on the lines 10—10 of FIG. 8.
Figure 11:
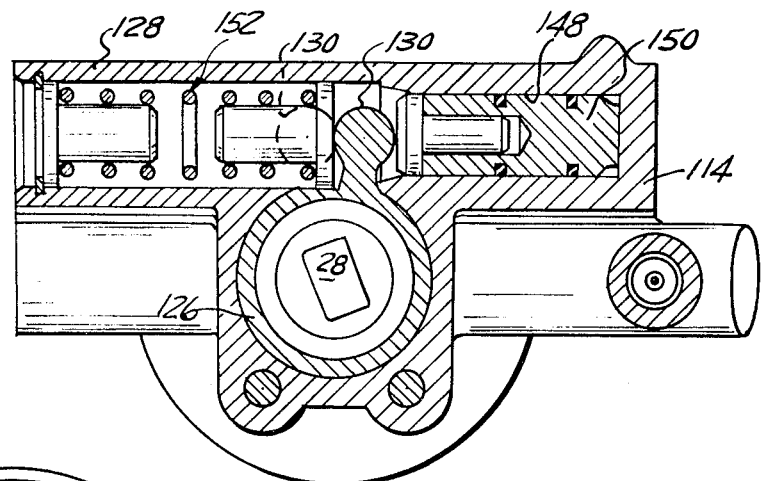
FIG. 11 is a sectional view taken on the lines 11—11 of FIG. 9.
Figure 13:
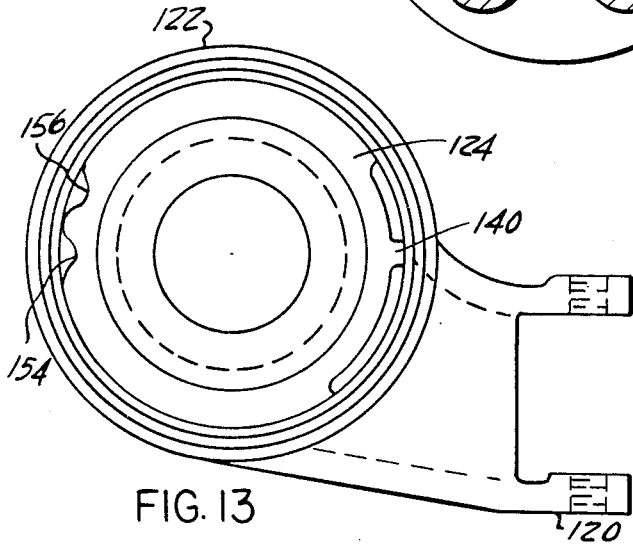
FIG. 13 is an end elevational view of the bracket portion of the shift control mechanism of FIG. 8, with portions of the mechanism removed to better illustrate a cam that is a part of the bracket portion.
Figure 12:
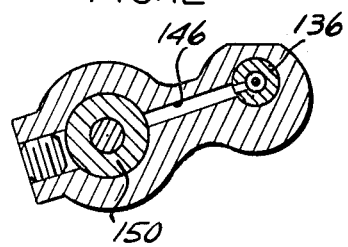
FIG. 12 is a sectional view taken on the lines 12—12 of FIG. 10.

Referring now to FIGS. 1–7, the one embodiment of the invention will be described. FIG. 1 shows a portion of a conventional motor vehicle that has a steering wheel 10 mounted on a steering column 12. The vehicle has a conventional automatic transmission 14 (only a fragment being shown) which is operated by transmission control means 16 that includes the lever selector 18, the shift lever 20, the rod 22, linkage 24, cross shaft 26, and a transmission lever 28 (FIG. 2). The automatic transmission has three forward speed settings which can be set by use of the lever selector 18, movement of which is transmitted to the automatic transmission by means of the transmission control means 16. The transmission lever 28 pivots around an axis that is transversed to the fore and aft direction of the motor vehicle and is identified by the line 30 in FIGS. 1 and 2.

The shaft control mechanism 32 is adapted to be mounted adjacent to or on the side of the automatic transmission 14 so as to be operatively connected to the end of the cross shaft 26 of the transmission control means 16.

The shift control mechanism 32 has a bracket portion 34 that is mounted in a stationary position in juxtaposition to the automatic transmission 14, and a rotary portion 36 that is coupled to the rotatable shift lever 28. The bracket portion 34 has at one end an arm 38 that includes a cam 40, and at its other end is an arm 42 that has a notch 44 that is located essentially diametrically opposite to the cam 40 with respect to the axis 30 about which the rotatable shift lever 28 turns.

The rotary portion 36 has one member 46 that is secured to the rotatable shift lever 28 for rotation therewith and a second or housing member 48 that is normally retained in the first position shown in FIG. 2 relative to the one member 46 and movable in response to an applied force to a second position relative to said one member. The housing member 48 contains spring means 50 comprising the coil spring 52 and the spring retaining elements 54. The spring means 50 nromally biases the one member 46 to the position shown in solid lines in FIG. 2.

An actuator piston 56, which has a button 58 at its one end, is positioned in the cylinder 60 of the housing member 48 for movement in actual alignment with the spring means 50 for moving the one member 46 about the axis 30 from the solid line to the broken-line position of the rotary lever 62. The actuator piston 60 is moved to the left as seen in FIG. 2 by means of hydraulic fluid transmitted to the right end of the piston through a circuit which will be described hereinafter, the hydraulic fluid normally being supplied from the brake fluid in the hydraulic brake system of the vehicle.

From the above description it is to be understood that the bracket portion 34 normally remains in a fixed position, and the rotary portion 36 will pivot about the axis 30 in accordance with the setting of the lever selector 18. Thus, when the lever selector 18 is set in the drive position of the automatic transmission, the rotary portion 36 will be in the solid-line position shown in FIG. 2. When the lever selector 18 is shifted to the "Park" position, the rotary portion 36 will be pivoted by the shift lever 28 to the broken-line position shown at 64, and similarly, when the lever selector 18 is shifted to the low speed drive position normally indicated by the letters "L1" the rotary portion 36 will be in the broken-line position shown at 66.

Only when the vehicle is being driven with the lever selector 18 set at the drive position is it desirable that the present invention operate so that the drag of the engine be used to aid in braking the vehicle, and therefore, the rotary portion includes the trigger means 68 which cooperates with the cam 40 to allow fluid under pressure to enter the cylinder 60 for actuating the piston 56 only from the drive position. The trigger means 68 includes the valve means 70 and the trigger 72 for opening the normally closed valve means 70. The trigger 72 is supported in a retainer 74 for limited axial movement, and the trigger 72 has a shoulder 76 which is urged or biased by the compression spring 78 against the shoulder 80 of the retainer 74. The trigger 72 can be urged to the left, as by the cam 40, to the position shown in FIG. 2.

The valve means 70 includes the ball 82, the ball retainer 84, which is urged to the right by the compression spring 86 for normally seating the ball 82 in closing relation to the port 88 in the end of the valve element 90. The latter has a passage 92 with a port 94 that is in communication with the passageway 96 in the housing member 48. The passageway 96 provides communication with the closed end of the cylinder 60.

The trigger means 68 also includes the rod 98 which has its one end abutting against the trigger 72 and its other end in contact with the ball 82. Thus, when the trigger 72 is pressed inwardly by means of the cam 40, the rod 98 will move the ball 82 off of its seat 88 to open the passage 92 through the valve element 90.

Figure 4:
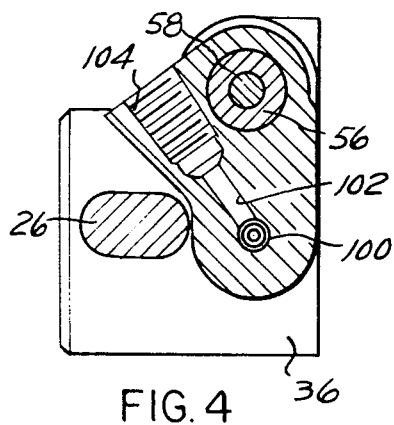
FIG. 4 is a section taken on the lines 4—4 of FIG. 2.
Figure 6:
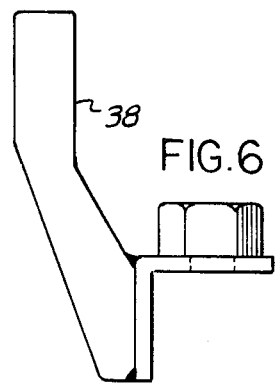
FIG. 6 is an end elevational view of the bracket portion of the shift control mechanism taken on the lines 6—6 of FIG. 2.
Figure 3:
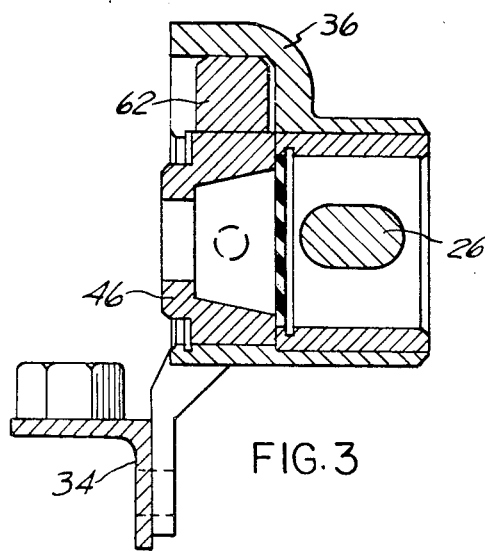
FIG. 3 is a section taken on the lines 3—3 of FIG. 2.
Figure 7:
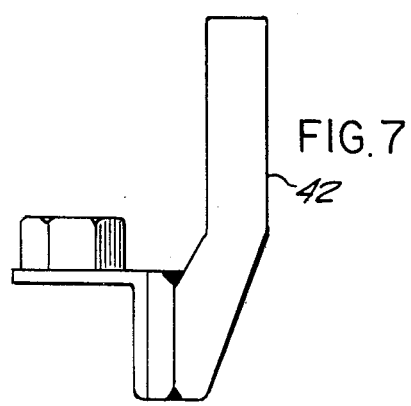
FIG. 7 is another end elevational view of the bracket portion of the shift control mechanism taken on the lines 7—7 of FIG. 2.

The valve means 70 is located partly within the passageway 100 in the housing member 48, and as can be seen in FIG. 4, a second passageway 102 is in communication with the passageway 100 and is also adapted to be connected at 104 with a source of hydraulic fluid under pressure, such as that which can be supplied from the brake system of the vehicle when the brake means are applied. When the rotary portion 32 is in the drive position shown in FIG. 2, and when the vehicle brakes are applied, a source of hydraulic fluid under pressure will be introduced through the passageway 102, the passageway 100, the valve element 90, the passageway 96, to the interior of the cylinder 60 urging the actuator piston 56 to the left and thereby shifting the one member 46 rotationally about the axis 30 to the broken-line position shown at 62. This will have the effect of shifting the lever selector 18 to the low speed or L2 position of the automatic transmission. Thus, when the brakes are applied with automatic transmission will be shifted automatically to its low speed position which will result in greater engine braking effort or drag being transmitted to the drive wheels and thereby providing additional assistance to slow down a rapidly moving vehicle. As soon as the brakes are released, the fluid under pressure to which the piston 56 has been subjected will be released, and the spring means 50 will then function to return the one member 46 to the solid-line position of the lever 62, as shown in FIG. 2.

To aid in retaining the rotary portion 36 in the operative position shown in FIG. 2 and to provide reaction forces to the housing 38 a detent means 106 is provided which also cooperates with the spring actuated plunger 108 and the notch 44 in arm 42 to hold the trigger means 68 in a centered position on the cam 40.

Attention is now directed to FIGS. 8–13 for a description of the second embodiment of the invention. This embodiment of the invention functions essentially the same as the embodiment previously described, but it is constructed in a different manner so that the trigger means 68 and the detent means 106 will be protected within the confines of the housing of the shift control mechanism 110. This embodiment of the invention includes a bracket portion 112 and a rotary portion 114. The bracket portion 112 is adapted to be mounted in juxtaposition to the automatic transmission such as to a flange 116 by means of bolts 118. The bracket portion is held in a stationary position and includes the bracket 120, the plate member 122, and the annular cam 124 which can be press fitted or otherwise suitably secured to the plate member 122. The rotary portion 114 includes the one member 126 that is secured to the rotatable shift lever 28 for rotation therewith and the second or housing member 128 normally retained in a first position relative to said one member 126 as indicated by the broken-line position of the rotary lever 130.

This embodiment of this invention also includes a trigger means 132 and a detent means 134 which will not be described in detail, because they are constructed and operate essentially the same as the corresponding means described with respect to the embodiment of FIGS. 1–7. Briefly, the trigger means 132 has its valve means 136 located radially outwardly of the cam 124, and the trigger means is actuated when the ball 138 is engaged by the cam 140, FIG. 13, and the ball 142 of the valve means 136 will be moved by the rod 143 to an open position when ball 138 is located on the cam 140. Thus, hydraulic fluid from the brake system can then enter through the inlet means 144 for flow through the valve means 136 and from there via the passageway 146, FIG. 12, to the outer end of the cylinder 148 which contains the actuator piston 150. Thus, in this embodiment of the invention application of the brake means will function to shift the lever selector 28 to its L1 position upon application of the brakes, and the lever selector 28 will be returned to its drive position by the spring means 152 in identically the same manner as was described with respect to the embodiments of FIGS. 1–7.

In the embodiment of the invention described in FIGS. 8–13, the annular cam ring 124 has a notch 154 forming a part of the detent means 134 for centering the rotary portion 114 so that the cam 140 is in suitable position to actuate the trigger means 132. A second notch 156 is also provided in the cam ring 124 so that the shift control mechanism 110 will be retained when in the neutral position of the transmission in such a position that the brake system of the vehicle cannot be influenced by operation of the vehicle brakes or the trigger means 132.

It is claimed:

1. In a motor vehicle, a multiple-speed automatic hydraulic transmission having three forward speed settings, manually operable transmission control means including a rotatable shift lever extending into said transmission for selectively setting the output speed of said transmission, wheel brake means, and a shift control mechanism responsive to the application of the wheel brake means at the highest transmission speed setting to shift said rotatable shift lever to a lower transmission speed setting and responsive to the release of the brake means to shift said rotatable shift lever back to said highest transmission speed setting, said shift control mechanism being non-responsive to the application of the brake means for shifting said rotatable shift lever at speeds other than said highest forward speed setting.

2. In a motor vehicle, the combination that is defined in claim 1, wherein said brake means includes vehicle brakes and an hydraulic system for applying the vehicle brakes, and said shift control mechanism is in communication with said hydraulic system so that the fluid of the hydraulic system during application of said vehicle brakes is operable to shift the rotatable shift lever to said lower transmission speed setting.

3. In a motor vehicle, the combination that is defined in claim 2, wherein said shift control mechanism includes spring means for automatically shifting said rotatable shift lever back to said highest transmission speed setting when the fluid pressure of said hydraulic system is reduced upon release of the brake means.

4. In a motoer vehicle, the combination that is defined in claim 2, wherein said shift control mechanism includes a trigger means that must be in an actuated position before said shift control mechanism can be responsive to the fluid of said wheel brake means, said trigger means being mounted for movement to an actuated position automatically when said rotatable shift lever is moved to said highest transmission speed setting.

5. In a motor vehicle, a multiple-speed automatic transmission, transmission control means for selectively setting the output speed of said transmission, wheel brake means, and a shift control mechanism responsive to the application of the wheel brake means at one transmission speed setting to shift said transmission control means to a second transmission speed setting and responsive to the release of the brake means to shift said transmission control means back to said one transmission speed setting, said transmission control means including a rotatable shift lever connected to said automatic transmission for setting the output speed of said transmission, and said shift control mechanism including a bracket portion mounted in a stationary position in juxtaposition with said transmission control means and a rotary portion coupled to said rotatable shift lever, said rotary portion having one member fixed to said rotatable shift lever for rotation therewith, a second member normally retained in a first position relative to said one member and responsive to an applied force associated with said brake means to move to a second position relative to said one member, spring means normally maintaining said second member in said one position, an actuator movable in response to said applied force for moving said second member against the spring action of said spring means to said second position, and trigger means in operative engagement with said bracket portion when said transmission control means is set at said one transmission speed setting for maintaining said actuator responsive to said applied force only at said one transmission speed setting, said second member operating when moved to its second position to shift said transmission control means to said second transmission speed setting.

6. In a motor vehicle, the combination that is defined in claim 5, wherein said actuator is movable in response to hydraulic fluid under pressure, and said trigger means includes a normally closed valve in a circuit for supplying said hydraulic fluid under pressure, said trigger means maintaining the valve open only when it is in said operative engagement with said bracket portion.

7. In a motor vehicle, the combination that is defined in claim 5, wherein said bracket portion includes a cam located so as to be engaged by said trigger means to operate the latter when said transmission control means is set at said one transmission speed setting.

8. In a motor vehicle, the combination that is defined in claim 7, wherein said cam is spaced radially outward from said rotary portion, and said trigger means extends radially outward from said rotary portion for engagement with said cam when the transmission control means is set at said one transmission speed setting.

9. In a motor vehicle, the combination that is defined in claim 7, wherein said cam is a segment of a ring that encircles said rotatable shift lever, and said trigger means extends radially inward in said rotary portion for engagement with said cam when the transmission control means is set at said one transmission speed setting.

10. In a motor vehicle, the combination that is defined in claim 7, wherein said bracket portion and said rotary portion have cooperating means to retain said trigger means in its engaged position with said cam.

11. In a motor vehicle, the combination that is defined in claim 10, wherein said bracket portion and said rotary portion have cooperating means to retain said rotary portion in a second position relative to said bracket portion that corresponds to the neutral position of said transmission.

12. An attachment for a motor vehicle that has an hydraulic brake system and a multi-speed automatic transmission with a rotatable shift lever for setting the output speed of the transmission, said attachment being operable to shift the transmission to a low speed setting when the hydraulic brakes are applied and to shift the transmission back to the normal drive setting when the hydraulic brakes are released, said attachment comprising a bracket portion adapted to be mounted in a stationary position and a rotary portion adapted to be coupled to said rotatable shift lever, said rotary portion having one member adapted to be secured to said rotatable shift lever for rotation therewith, a second member normally retained in a first position relative to said one member and movable in response to an applied force to a second position relative to said one member, spring means biasing said second member to said one position, an actuator piston movable in response to hydraulic fluid under pressure for moving said second member against the biasing action of said spring means to said second position, and hydraulic passage means for introducing hydraulic fluid to said actuator piston when the hydraulic brakes of the vehicle are applied.

13. The attachment that is defined in claim 12, wherein said hydraulic passage means includes a normally closed valve, and a trigger is located in said rotary portion and is engagable by said bracket portion in one position of said rotary portion to hold said normally closed valve open.

14. The attachment that is defined in claim 13, wherein said bracket portion and said rotary portion have cooperating detent means to retain said rotary portion in said one position.

15. The attachment that is defined in claim 14, wherein said bracket portion and said rotary portion have cooperating detent means to retain said rotary portion in another position angularly displaced from said one position.

* * * * *